United States Patent
Chen et al.

(10) Patent No.: US 7,782,899 B2
(45) Date of Patent: Aug. 24, 2010

(54) MULTIPLE CARRIER RESOURCE MANAGEMENT

(75) Inventors: Pi-Chun Chen, Lake Hiawatha, NJ (US); Qinqing Zhang, Morganville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 911 days.

(21) Appl. No.: 11/349,273

(22) Filed: Feb. 8, 2006

(65) Prior Publication Data

US 2007/0168482 A1   Jul. 19, 2007

Related U.S. Application Data

(63) Continuation-in-part of application No. 11/334,421, filed on Jan. 19, 2006, now abandoned.

(51) Int. Cl.
H04J 3/16 (2006.01)
(52) U.S. Cl. .................................................. 370/468
(58) Field of Classification Search .............. 370/229, 370/235, 230, 232, 233, 236, 236.1, 464, 370/465, 468; 455/403, 422.1, 450
See application file for complete search history.

(56) References Cited

U.S. PATENT DOCUMENTS

| 6,611,506 | B1* | 8/2003 | Huang et al. .................... 370/329 |
| 2005/0014524 | A1 | 1/2005 | Lott et al. | |
| 2005/0207441 | A1* | 9/2005 | Onggosanusi et al. ....... 370/464 |
| 2006/0203724 | A1* | 9/2006 | Ghosh et al. .................. 370/229 |
| 2007/0042798 | A1* | 2/2007 | Chen et al. .................... 455/522 |

FOREIGN PATENT DOCUMENTS

| GB | 2 355 890 A | 5/2001 |
| WO | WO 2006/096789 A1 | 9/2006 |

OTHER PUBLICATIONS

"cdma2000 High Rate Packet Data Air Interface Specification." 3GPP2 C.S0024-A, Version 2.0, Jul. 2005.
PCT International Search Report mailed Jul. 25, 2007 for corresponding Application No. PCT/US2007/003295.

* cited by examiner

Primary Examiner—Kwang B Yao
Assistant Examiner—Obaidul Huq
(74) Attorney, Agent, or Firm—Harness, Dickey & Pierce

(57) ABSTRACT

In one embodiment, a transmission resource for transmitting data from a number of applications in a multiple carrier communication system is managed. In this embodiment, an aggregate transmission resource available to the number of applications is determined, and the determined aggregated transmission resource is distributed to each carrier based on a load on each carrier. In another embodiment a potential transmission resource for each application on each carrier is determined, and a carrier transmission resource for each carrier is determined based on the determined potential transmission resource for each application on the carrier. Data from at least one of the applications is assigned to at least one of the carriers based on the transmission resource distributed to or determined for the carrier, and the assigned data is transmitted on the carrier.

33 Claims, 6 Drawing Sheets

MULTIPLE CARRIER RESOURCE MANAGEMENT

This is a continuation-in-part application of application Ser. No. 11/334,421, filed Jan. 19, 2006 now abandoned, the entire contents of which are hereby incorporated by reference.

BACKGROUND OF THE INVENTION

A Code Division Multiple Access (CDMA) Communication system is designed to operate over a bandwidth of a fixed size. For example, a 1x-EVDO communication system operates on 1.25 MHz bandwidth. Because of this limited resource, resource management plays an important role in a CDMA communication system. In a 1x-EVDO communication system, a base transceiver station (BTS) serves the communication needs of access terminals (ATs) in the coverage area of the BTS. An AT may be a wireless phone, wireless equipped PDA or computer, etc.; and may also be referred to as a mobile station or mobile unit. Communication from the BTS to an AT is referred to as forward or down link communication, and communication from an AT to the BTS is referred to as reverse or uplink communication.

The current version of the 1x-EVDO standard provided in 3GPP2 C.S0024-A v2.0, sets forth a resource management methodology in the reverse link based on a bucket filling concept and is hereby incorporated by reference in its entirety. Because this standard is so well-known, the standard, as it pertains to the subject invention, will not be described in detail; but instead, will only be briefly discussed. Furthermore, this description, for the sake of brevity, will concern reverse link resource management.

In the reverse link of a 1x-EVDO Revision A system, there are a total of 6 channels per user: one traffic channel and five overhead channels. The five overhead channels include a pilot channel, a data rate control (DRC) channel, a data source control (DSC) channel, an acknowledgement (ACK) channel, and a reverse rate indication (RRI) channel. The pilot channel is used for channel estimation of the air interface between the BTS and the AT, and is used for power control purposes. Power control makes sure that the received pilot channel power at the BTS is stable and results in a stable channel estimation. Accordingly, transmission power of the other channels are defined by channel gains with respect to the pilot channel. For the traffic channel, the transmit power is specified by a power gain called the traffic-to-pilot (T2P) power gain.

The bucket filling methodology present in the 1x-EVDO RevA standard treats T2P as a resource, which may be accumulated and used. Typically, a bucket is defined for each radio link flow; for example, data flow from one of the applications running at the AT. For simplicity, the bucket filling methodology will be described for the case of a single radio link or application flow. However, it will be understood that 1x-EVDO provides for managing the T2P resource for multiple link flows.

The amount of T2P resource added to the bucket is referred to as the T2PInflow, and the amount of T2P resource used is referred to as the T2POutflow. As a result, the amount of T2P resource in the bucket, referred to as the BucketLevel, is a function of the T2PInflow and the T2POutflow.

The AT determines the T2PInflow based on reverse activity bits (RABs) received by the AT from the BTS and a pilot signal strength of the forward link pilot signal. The BTS transmits a RAB to an AT per time slot (a short time duration) to inform the AT of the loading condition at the BTS. If the loading, or the total received power, is below a threshold, the RAB bit is set to "0". Otherwise, if the loading is above a threshold, the RAB bit is set to "1". The value of the RAB bits indicates the current loading condition at the base station. The RAB bit is binary modulated (e.g., to "−1" for a value of "0" and "1" for a value of "1") and transmitted to the AT. Using the RABs received over time, the AT determines a quick RAB (QRAB) and a filtered RAB (FRAB). Both the QRAB and FRAB are filtered versions of the RABs received over time, but the QRAB has a significantly smaller time constant than that of the FRAB. In other words, the QRAB is a short term load indicator, and the FRAB is a long term load indicator. The AT determines the T2PInflow as a function of the QRAB, FRAB and measured pilot strength.

Based on the T2P inflow and BucketLevel, the AT determines a potential outflow for transmission, referred to as PotentialT2POutflow. The PotentialT2POutflow indicates the amount of T2P resource that may be used during transmission; and therefore, indicates the amount of available T2P resource for the current transmission. The Potential P2POutflow is a function of the BucketLevel, the FRAB, the T2PInflow, and a BucketFactor. The BucketFactor indicates by what factor the T2POutflow may exceed the T2PInflow. Using the PotentialT2POutflow, the AT determines the packet size for transmission, and the actual power or T2P used in transmission, referred to as TxT2P, is determined as a function of the packet size and the transmission mode. As is known, the AT may operate in a low latency (LoLat) transmission mode or a high capacity (HiCap) transmission mode.

As will be appreciated, the transmitted packet includes headers, etc., according to protocol in addition to the data d from the application. Accordingly, after transmission, the AT determines the T2POutflow as a function of the data d (usually expressed in octets) and the TxT2P.

As will be appreciated, this description merely provides an overview of the resource management methodology in 1x-EVDO, and the exact details for the various functions, etc. mentioned above are well-known and may be readily obtained from the standard. In addition, for the sake of simplicity, this overview has excluded mentioning the various constraints such as minimum and maximum permitted T2PInflow, that one skilled in the art will appreciate are included in the methodology.

While the above described resource management methodology aids in improving capacity and meeting quality of service (QoS) requirements for subscribed ATs, the single carrier architecture discussed above may not meet the needs created by increasing amounts of data traffic. As a result, more and more bandwidth is demanded in order to support a greater number of users and higher data throughout. Without introducing too much change to the core of the single-carrier design in 1x-EVDO, a Multiple-Carrier CDMA (MC-CDMA) system has been suggested to scale the system capacity when more bandwidth is available. For instance, if 5 MHz of bandwidth is available, then a 3-carrier 1x-EVDO system may be used to increase the capacity of a single-carrier 1x-EVDO system by at least 3 times. In its simplest form, each carrier is managed independently according to the 1x-EVDO standard.

The operation of MC-CDMA systems presents several challenges and provides several opportunities in the areas of resource management. For example, an MC-CDMA system should maintain the QoS (Quality of Service) for different applications while minimizing the resources consumed. Secondly, the MC-CDMA should be able to exploit multiple carrier diversity gain. Thirdly, the MC-CDMA system should be able to achieve load balancing among carriers, and exploit pooling efficiency within the system.

SUMMARY OF THE INVENTION

The present invention provides a method of resource management for a multiple carrier communication system.

In one embodiment, a transmission resource for transmitting data from a number of applications in a multiple carrier communication system is managed. In this embodiment, an aggregate transmission resource available to the number of applications is determined, and a portion of the determined aggregated transmission resource is distributed to each carrier based on a load on each carrier. Data from at least one of the applications is assigned to at least one of the carriers based on the portion of the determined aggregate transmission resource distributed to the at least one carrier, and the assigned data is transmitted on the at least one carrier.

In one embodiment, a global load representative of a collective load on the multiple carriers is determined, and the aggregate transmission resource is determined based on the determined global load.

In another embodiment, the transmission resource is a traffic-to-pilot power gain.

In a further embodiment, a packet size of a transmission packet for each carrier is determined based on the portion of the determined aggregate transmission resource distributed to the carrier. Data is loaded in the transmission packet for the carrier based on the determined packet size of the transmission packet for the at least one carrier. For example, in one embodiment, an individual transmission resource available to an application is determined. An amount of data from the application to load onto the carriers is then determined based on the determined individual transmission resource available to the application, the determined aggregate transmission resource, and the determined packet sizes of the packets for the carriers.

In one embodiment, the transmission packet for the carrier is transmitted at a power associated with a size of the transmission packet.

In another embodiment, a potential transmission resource for each application on each carrier is determined, and a carrier transmission resource for each carrier is determined based on the determined potential transmission resource for each application on the carrier. Then, data from at least one of the applications is assigned to at least one of the carriers based on the determined carrier transmission resource for the at least one carrier, and the assigned data is transmitted on the at least one carrier.

This embodiment may further include determining a potential transmission resource for each application across the carriers, and selectively adjusting the determined potential transmission resource for an application on each carrier based on the determined potential transmission resource for the application across the carriers.

In another embodiment, the method includes scaling the determined potential transmission resource for each application across the carriers based on a number of carriers supported for transmission, and using the scaled determined potential transmission resource for each application across the carriers in the adjusting operation.

In a further embodiment, a packet size of a transmission packet for the at least one carrier is determined based on determined carrier transmission resource for the at least one carrier, and data is loaded in the transmission packet for the at least one carrier based on the determined packet size of the transmission packet for the at least one carrier.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

The embodiments of the present invention provide resource management methodologies for a MC-CDMA system. In describing embodiments of the present invention, the same terminology as used in the 1x-EVDO system set forth in 3GPP2 C.S0024-A v2.0 will be used. Furthermore, it will be understood that these terms have the same definition and are determined in the same manner as set forth in 3GPP2 C.S0024-A v2.0 unless explicitly stated to the contrary. For the sake of brevity, the embodiments of the present invention will be described for reverse link resource management. Furthermore, for simplicity, the embodiments of the present invention will be described for the case of an arbitrary number of radio link or application flows (e.g., one or more than one applications running at an AT), and an MC-CDMA system employing N carriers, where N is greater than 1.

Figure 1:
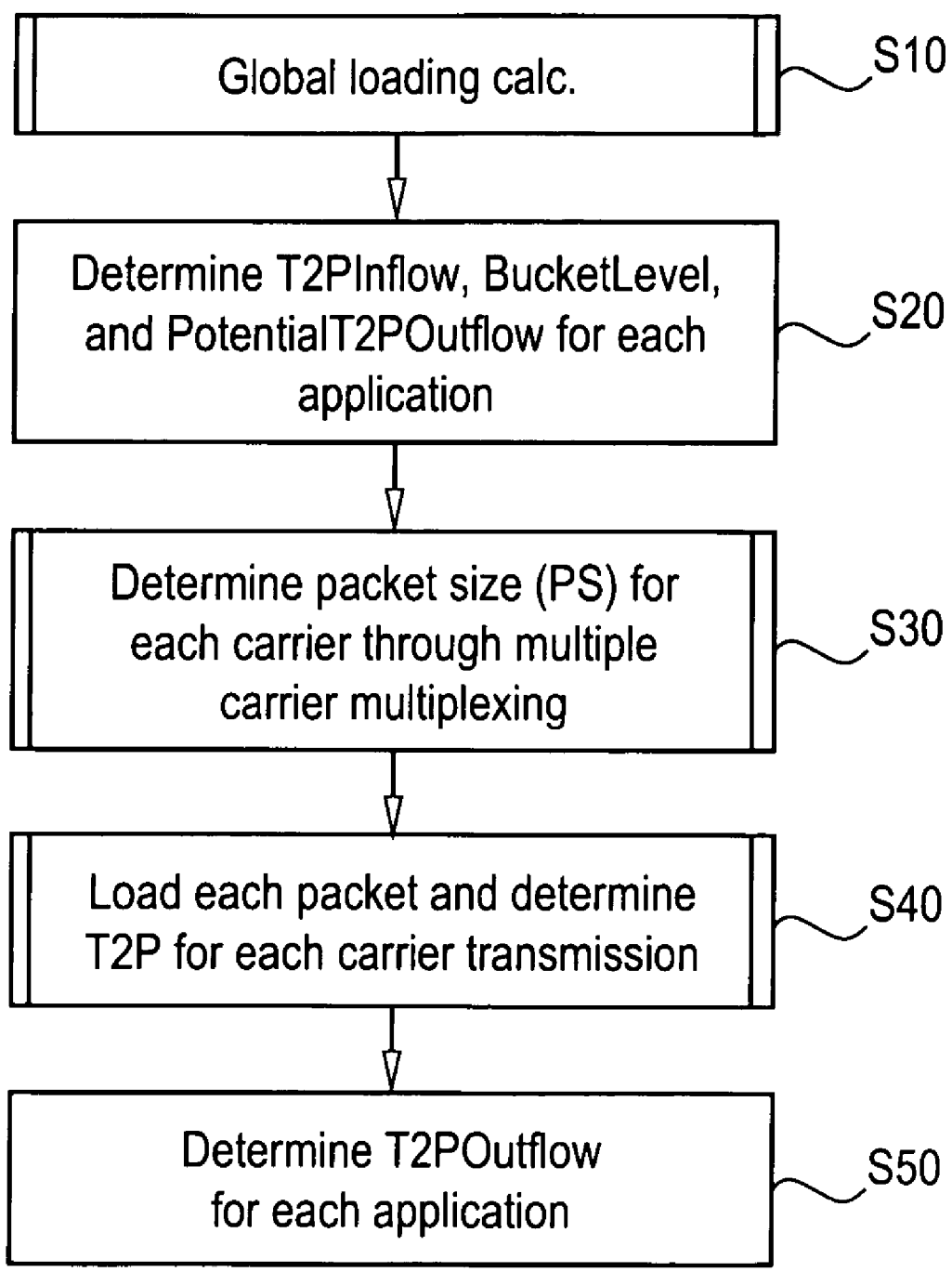
FIG. 1 illustrates a flow chart of the resource management method employed at an AT according to an embodiment of the present invention.

FIG. 1 illustrates a flow chart of the resource management method employed at an AT according to an embodiment of the present invention. As shown, in step S10, the AT calculates global loading. More specifically, the AT determines global versions of QRAB and FRAB.

Figure 2:
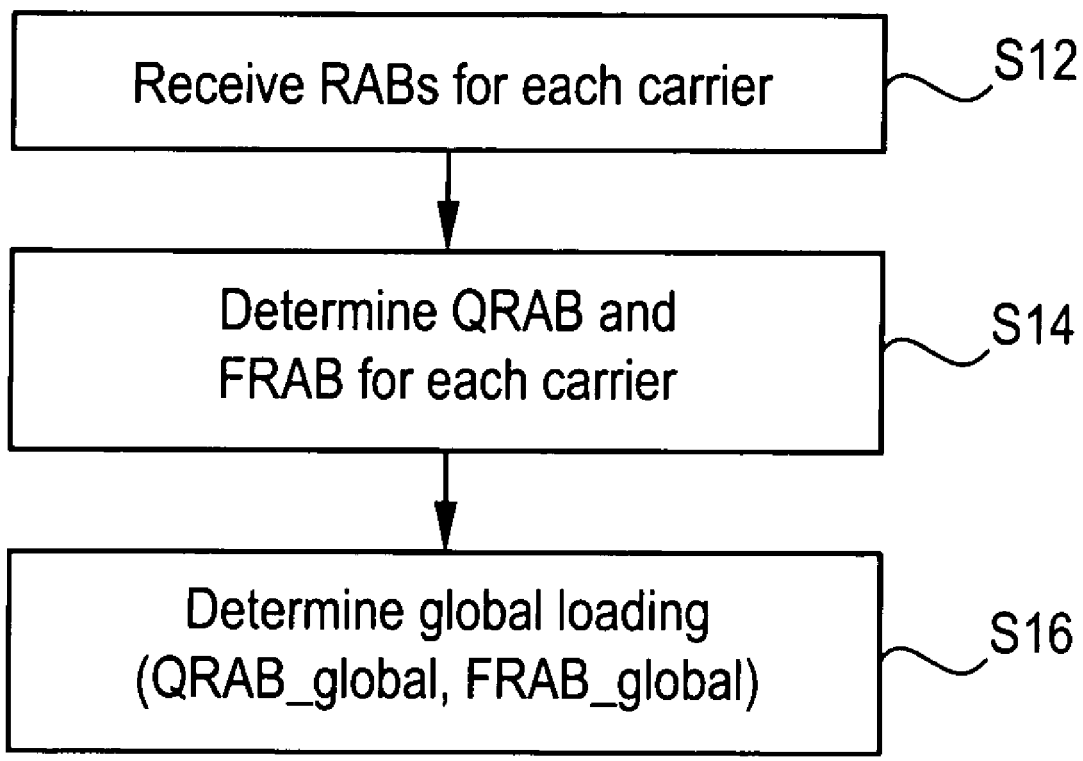
FIG. 2 illustrates a flow chart of the method for determining global loading according to an embodiment of the present invention.

FIG. 2 illustrates a flow chart of the method for determining global versions of QRAB and FRAB according to an embodiment of the present invention. As shown, in step S12, the AT receives the RABs for each carrier. Then, in step S14, the AT determines the QRAB and FRAB for each carrier using the RABs received for that carrier over time in the well-known manner set forth in 3GPP2 C.S0024-A v2.0.

For example, for each received RAB, the AT will first make a soft decision on the modulated RAB bit, which will be a real number between −1 and 1. This soft metric is then passed to two of IIR filters (Infinite Impulse Response Filter): one with a shorter time constant (e.g., filtering 4 RABs) and the other longer time constant (e.g., filtering over 384 RABs). After the filtering, the output from the short term filter is then quantized into a binary value of either −1 or 1, which is referred to as the QRAB. The quantization may be based on a threshold value of zero such that a filtered soft metric value equal to or greater than 0 is determined to be a 1, and a filtered soft metric value less than 0 is determined to be a −1.

On the other hand, the loading output from the long term filter is not quantized and remains to be a real number between −1 and 1, which is denoted as FRAB.

Next, in step S16, the AT determines global loading. In particular, the AT determines a global QRAB and a global FRAB. These values are considered global in that the $QRAB_{global}$ and $FRAB_{global}$ are representative of the QRAB and FRAB for the N carriers collectively. The $QRAB_{global}$ is determined as the minimum of the QRAB for the N carriers as expressed in equation (1) below:

$$QRAB_{global} = \min_n QRAB_n \quad (1)$$

where n=1 to N.

The $FRAB_{global}$ may also be determined as the minimum of the FRAB for the N carriers as expressed in equation (2) below:

$$FRAB_{global} = \min_n FRAB_n \quad (2)$$

where n=1 to N.

Alternatively, the $FRAB_{global}$ may be determined as an average of the FRAB for the N carriers as expressed in equation (3) below:

$$FRAB_{global} = \frac{\sum_n FRAB_n}{N} \quad (3)$$

where n=1 to N.

As a still further alternative, the $FRAB_{global}$ is feedback directly on a separate forward link channel, which conveys loading information, from the BTS.

Returning to the flow chart of FIG. 1, in step S20, the AT determines the T2PInflow, BucketLevel and PotentialT2P for each application (e.g., each radio link flow). Each of these values is determined in the same manner as set forth in 3GPP2 C.S0024-A v2.0 except that the $FRAB_{global}$ and $QRAB_{global}$ are used in place of the FRAB and QRAB. Namely, as discussed in the Background section, the T2PInflow is a function of the measured pilot strength on the forward link, T2POutflow, and the FRAB and QRAB.

As also discussed in the Background section, the BucketLevel for an application is a function of the T2POutflow and T2PInflow. Determination of the T2POutflow will be discussed with respect to step S50 below. It will be appreciated, that the T2POutflow for the application determined in the previous iteration of FIG. 1 is used in step S20 during the current iteration to determine the BucketLevel.

In the Background, it was also mentioned that the PotentialT2POutflow of an application is a function of the BucketLevel, the FRAB, the T2PInflow, and a BucketFactor. Accordingly, in this embodiment of the present invention, the global FRAB is used, instead of the FRAB for a particular carrier, in determining the PotentialT2POutflow for the application. It will be recalled that the BucketFactor indicates by what factor the T2POutflow may exceed the T2PInflow.

Figure 3:
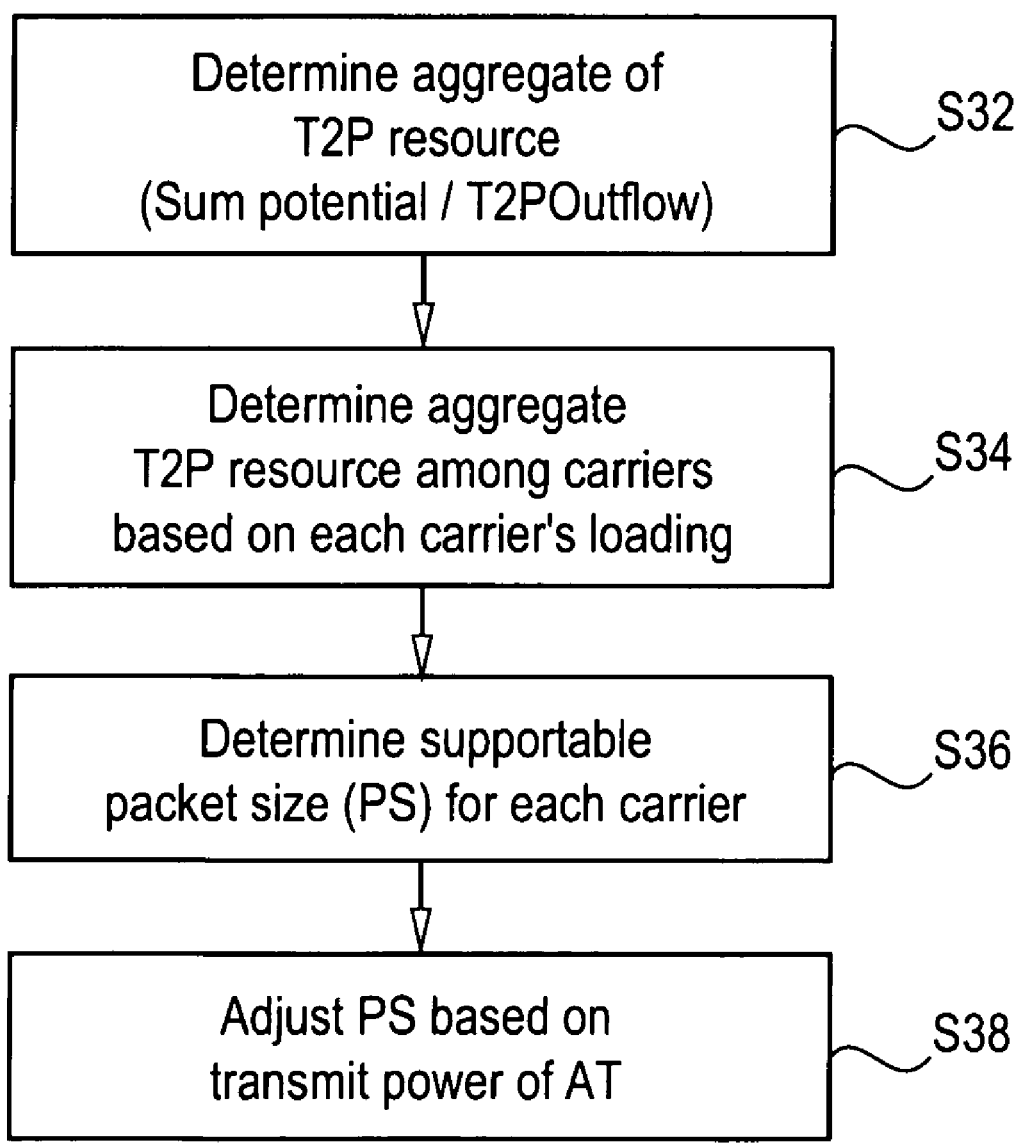
FIG. 3 illustrates a flow chart of a method for determining the packet size for each carrier according to an embodiment of the present invention.

Next, in step S30, AT determines how much T2P resource each carrier should consume. Consumption of the T2P resource is characterized in terms of the packet size for each carrier. Accordingly, in step S30, the AT determines the packet size (PS) each carrier can support. FIG. 3 illustrates a flow chart of a method for determining the packet size for each carrier according to an embodiment of the present invention.

As shown, in step S32, the AT determines an aggregate of the T2P resource available to the applications for transmission of their data on a transmission mode basis. As discussed above, 1x-EVDO provides for a low latency (LoLat) transmission mode and a high capacity (HiCap) transmission mode. The T2P resource for different transmission modes are not aggregated together, and it is assumed in this embodiment that the AT transmits according to only one transmission mode per flow. The aggregate is the sum of the PotentialT2POutflows for the carriers determined in step S20 and will be referred to as $SumPotentialT2POutflow_{TM}$, where TM indicates the transmission mode. This may be expressed as equation (4) below:

$$SumPotentialT2POutflow_{TM} = \quad (4)$$
$$\sum_i \min \begin{pmatrix} f1_{TM}(BucketLevel_i, T2PInflow_i), \\ f2(BucketFactor_i, FRAB_{global}, T2PInflow_i) \end{pmatrix}$$

where $$f1_{TM}(;) = \begin{cases} BucketLevel_i/2 + T2PInflow_i, & \text{if } TM = LoLat, \\ BucketLevel_i/4 + T2PInflow_i, & \text{if } TM = HiCap \end{cases}$$

$$f2(;) = BucketFactor_i(10*\log 10(T2PInflow_i), FRAB_{global})*$$
$$T2PInflow_i.$$

$BucketLevel_i$ is the bucket level of application i
$T2PInflow_i$ is the inflow into the bucket of application i
TM: Transmission mode
$FRAB_{global}$: the global view of FRAB from all carriers
i is the ith application Except for using $FRAB_{global}$ instead of FRAB, those skilled in the art will recognize the following minimization function as a well-known function provided in the 1x-EVDO standard for determining the PotentialT2POutflow for application (or radio link flow) i:

$$\min(f1_{TM}(BucketLevel_i, T2PInflow_i), f2(BucketFactor_i, FRAB_{global}, T2PInflow_i)) \quad (5)$$

Next, in step S34, the AT distributes the aggregate T2P resource among the carriers based on each carrier's loading. Namely, a portion, $p_n$, of the $SumPotentialT2POutflow_{TM}$ is allocated to the nth carrier based on the $FRAB_n$, which is the FRAB for the nth carrier determined in step S14. An example embodiment for determining the portion $p_n$ and the $PotentialT2Poutflow_{TM}$ for nth carrier are set forth below by equations (6) and (7).

$$p_n = \left[\frac{1}{FRAB_n + 1}\right] * \frac{1}{\sum_{i=1}^{N}(FRAB_i + 1)^{-1}} \quad (6)$$

$$PotentialT2POutflow_{TM\_Carrier_n} = p_n * SumPotentialT2POutflow_{TM} \quad (7)$$

After determining the potential resource allocated to a carrier, PotentialT2POutflow$_{TM\_}$Carrier$_n$, this value is compared to an empirically determined threshold value, Threshold_T2POutflow. If PotentialT2POutflow$_{TM\_}$Carrier$_n$ is less than the Threshold_T2Poutflow, then the portion $p_n$ for the nth carrier is set to zero and the PotentialT2POutflows for the other carriers are recalculated by normalizing the $p_n$. In other words, each $p_n$ is updated as $$p_{n\_new} = \frac{p_{n\_old}}{\sum_{i=1}^{N} p_{i\_old}},$$

so that the sum of $p_{n\_new}$ equals to 1.

Using the determined PotentialT2POutflows for each carrier, the AT determines the largest supportable packet size (PS) for each carrier. Namely, the AT applies the following constraint to select the packet size for a carrier:

$$10^{TxT2PtMNominalPS_{TM}/10} \leq \text{PotentialT2POutflow}_{TM\_}\text{Carrier}_n \quad (8)$$

where TxT2PTMNominalPS$_{TM}$ is the transmit T2P value for a packet of size PS transmitted in transmit mode TM. For each carrier, the AT starts with the largest packet size permitted according to the standard, and determines the transmit T2P value for this packet size given the transmission mode TM. As stated in equation (8), this transmit T2P value is referred to as TxT2PTMNominalPS, and may be accessed from a look-up table stored at the AT using the packet size. The look-up table values may be established according to the standard, and if not, may be empirically determined. If the constraint is met, the packet size is selected for the carrier. If the constraint is not met, the packet size is reduced to the next largest packet size, and the constraint is tested again. This process continues until a packet size satisfying the constraint is determined for the carrier. The entire process starting from the largest packet size is then repeated for each carrier such that the packet size for each carrier is determined based on the respective PotentialT2POutflow$_{TM}$ for each carrier.

In step S38, the packet size established for one or more of the carriers may be adjusted based on the transmit power of the AT. Namely, the AT sums the TxT2PTMNominalPS values for the carriers to obtain a total transmit power that will be used in transmitting the packets for each carrier. If the total transmit power exceeds the AT's maximum transmit power, then the packet size (PS) established for at least one of the carriers is adjusted (e.g., reduced). In one embodiment of the present invention, the carriers are ranked from smallest packet size to largest packet size. Then, the carrier with the smallest packet size has its packet size reduced. The TxT2PNominal is then determined from the look-up table, and the total transmit power is determined again. If the total transmit power still exceeds the maximum transmit power of the AT, the process is repeated. As will be appreciated, a carrier's packet size may be reduced to zero, in which case the carrier is no longer used. In this case, the ranking of carriers in ascending order by packet size will no longer include the unused carrier, and the process continues until the total transmit power does not exceed the maximum transmit power of the AT.

In summary, in step S30 the AT determines how much resource each carrier should consume. This is accomplished by calculating the aggregate available resource from all eligible applications; and then, based on each carrier's loading condition, the potential resource that can be consumed by each carrier is determined. The resource distribution principle is to distribute more resource to a lightly loaded carrier than a heavily loaded carrier in order to achieve load balancing. In addition, if a carrier's allowable resource is too small, transmission will not be allowed on this carrier; and optionally, the resource is re-distributed among other carriers. Finally, based on the resource budget on each carrier, the allowable transmission packet sizes on each carrier, constrained by AT's maximum transmission power, are obtained.

Figure 4:
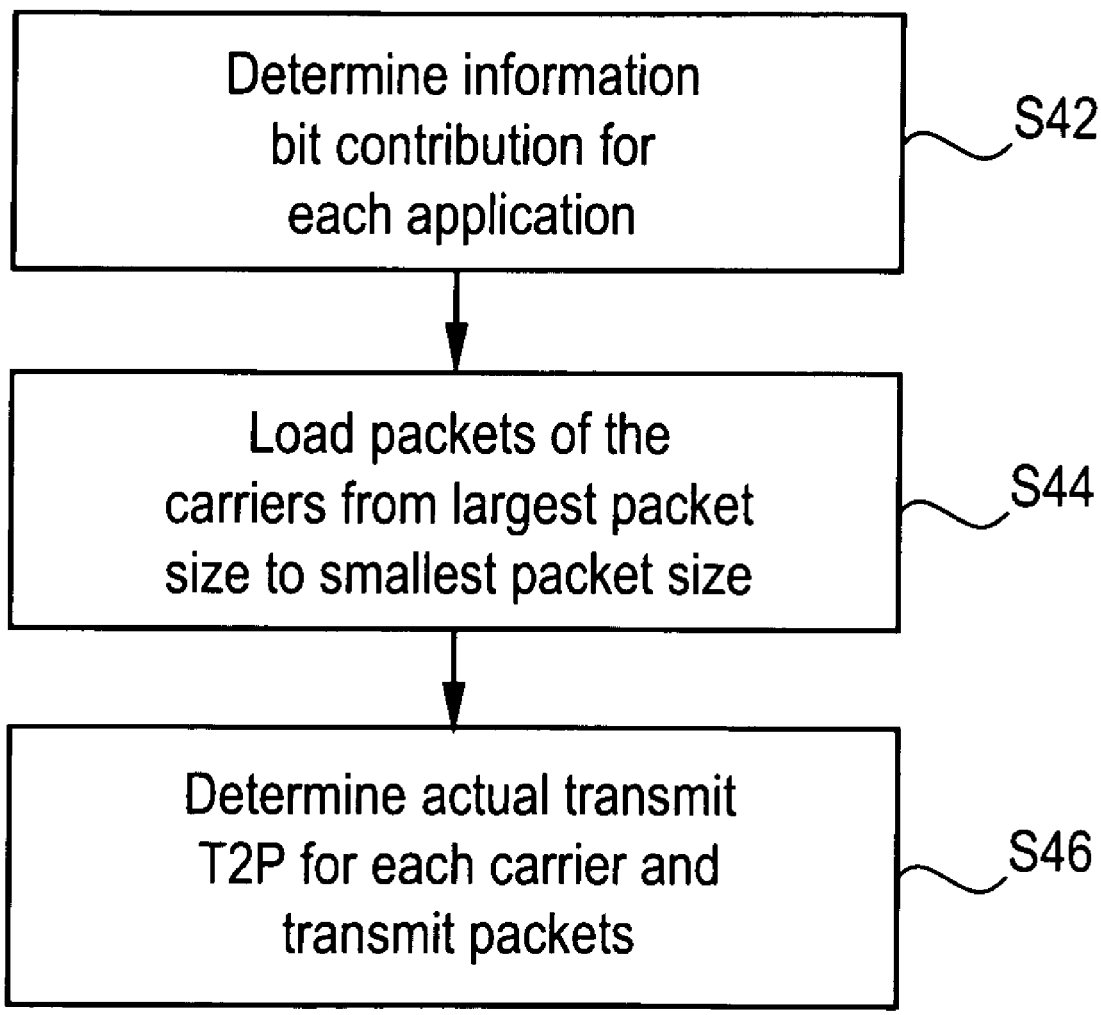
FIG. 4 illustrates a flow chart of step S40 in FIG. 1 according to one embodiment of the present invention.

Returning to FIG. 1, in step S40, the AT loads each packet with data from the respective applications, and determines the actual transmit T2P for the carrier based on the loading. FIG. 4 illustrates a flow chart of this step in greater detail. As shown, in step S42, the information bit contribution $d_i$ from each application i is determined. In one embodiment, the information bit contribution may be determined according to expression (9) below:

$$d_i = \min\left(Q_i, \frac{\text{PotentialT2POutflow}_i}{\sum_{i \in F_{TM}} \text{PotentialT2POutflow}_i} * \sum_n PS_n\right), \quad (9)$$

where $F_{TM}$ is the set of applications that are eligible for transmission using transmission mode TM, $d_i$ is the payload contribution from application i, and Qi is the amount of data in the transmission buffer for application i.

Next, in step S44 the carriers are ranked from largest packet size to smallest packet size. The AT fills the carrier's packets with the information bits from the applications starting with the carrier with the largest packet size and in descending packet size order until either the packets of all the carriers have been filled or all information bits have been exhausted. In one embodiment, the information bits are loaded from with the application having the largest payload contribution (e.g., the largest amount of information bits to be loaded) to the application with the smallest payload contribution. Furthermore, if the packet of a carrier may be reduced to a smaller packet size and still carry the same amount of information bits, then the packet size for that carrier is reduced. This step distributes resource among applications such that each individual QoS requirement can be met.

Next, using the look-up table discussed above, the AT accesses the transmit T2P for each carrier based on the final packet size of each carrier in step S46. This actual transmit T2P is referred to as the TxT2PPS$_n$ for carrier n. The packets are then transmitted on their respective carriers at the respective TxT2PPS.

Returning to FIG. 1, having used the T2P resource in transmitting packets in step S46 of FIG. 4, in step S50, the AT determines the T2POutflow for each application based on the actual T2P resource used. In one embodiment of the present invention, the T2POutflow for each application i may be determined according to expression (10) below:

$$T2POutflow_i = \frac{di}{\sum_{i \in F_{TM}} di} * \sum_n T \times T2PPS_n \quad (10)$$

Figure 5:
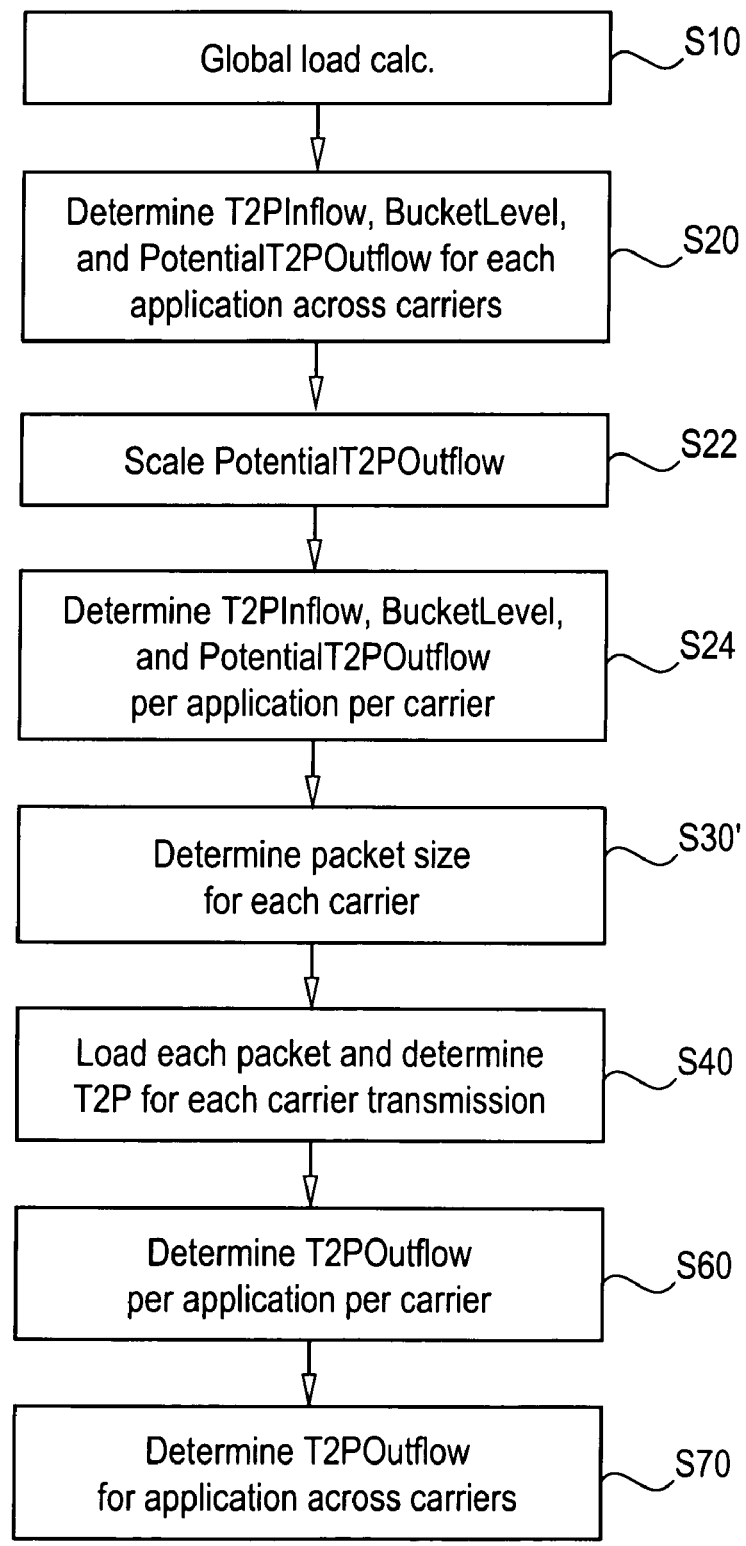
FIG. 5 illustrates a flow chart of the resource management method employed at an AT according to another embodiment of the present invention.

FIG. 5 illustrates a flow chart of the resource management method employed at an AT according to another embodiment of the present invention. As shown, in step S10, the AT calculates global loading. More specifically, the AT determines global versions of QRAB and FRAB as described previously with respect to FIG. 2.

In this embodiment, resource management involves treating the T2P resource according to two levels. An upper layer or level provides for—resource policing management, and a lower layer or level provides for resource provisioning management. At the upper layer, a bucket filling methodology employing a bucket for each application across the carriers is maintained similar to that described above with respect to FIG. 1. At the lower level, a bucket is maintained per application per carrier. For example, assuming first and second carriers and first and second applications, the lower level maintains a bucket for the first application on the first carrier, a bucket for the first application on the second carrier, a bucket for the second application on the first carrier, and a bucket for the second application on the second carrier.

Next, the management of these upper layer and lower layer buckets will be described with respect to steps S20-S24, as well as steps S50 and S60. First, the upper layer bucket management will be discussed with respect to steps S20 and S22. In step S20, the AT determines the T2PInflow, BucketLevel, and PotentialT2POutflow for each application across the carriers as described with respect to step S20 in FIG. 1. Namely, each of these values is determined in the same manner as set forth in 3GPP2 C.S0024-A v2.0 except that the $FRAB_{global}$ and $QRAB_{global}$ are used in place of the FRAB and QRAB. Namely, as discussed in the Background section, the T2PInflow is a function of the measured pilot strength on the forward link, T2POutflow, and the FRAB and QRAB.

As also discussed in the Background section, the BucketLevel for an application is a function of the T2POutflow and T2PInflow. Determination of the T2POutflow will be discussed with respect to step S70 below. It will be appreciated, that the T2POutflow for the application determined in the previous iteration of FIG. 5 is used in step S20 during the current iteration to determine the BucketLevel. In the Background, it was also mentioned that the PotentialT2POutflow of an application is a function of the BucketLevel, the FRAB, the T2PInflow, and a BucketFactor. Accordingly, in this embodiment of the present invention, the global FRAB is used, instead of the FRAB for a particular carrier, in determining the PotentialT2POutflow for the application across the carriers. It will be recalled that the BucketFactor indicates by what factor the T2POutflow may exceed the T2PInflow.

Next, in step S22, the AT scales the PotentialT2POutflow of each application determined in step S20. Namely, the $PotentialT2POutflow_i$ of application i across the carriers is scaled, for example multiplied, by a scaling factor, $T2PScalingFactor_i$ to produce $Scaled\_PotentialT2POutflow_i$. The scaling factor is determined according to the following expression:

$$T2PScalingFactor_i = 1 + \frac{(1 - FRAB_{global}) * (\text{Num\_Carriers} - 1)}{2} \quad (11)$$

where Num_Carriers is the number of carriers supported by the AT.

Next, lower layer bucket management will be discussed with respect to step S24. In step S24, the AT determines the T2PInflow, BucketLevel, and PotentialT2POutflow per application per carrier. Namely, each of these values is determined in the same manner as set forth in 3GPP2 C.S0024-A v2.0 except that only the information relating to the application on a particular carrier is used. For example, the FRAB and QRAB for the application on a particular carrier are used. Namely, as discussed in the Background section, the T2PInflow is a function of the measured pilot strength on the forward link, T2POutflow, and the FRAB and QRAB for that portion of the carrier carrying the data of the application.

As will be appreciated, the BucketLevel per application per carrier is a function of the T2POutflow and T2PInflow per application per carrier. Determination of the T2POutflow per application per carrier will be discussed with respect to step S60 below. It will be appreciated, that the T2POutflow per application per carrier determined in the previous iteration of FIG. 5 is used in step S24 during the current iteration to determine the BucketLevel.

The PotentialT2POutflow per application per carrier is determined according to the following expression:

$$PotentialT2POutflow_{TM,i,Carrier_n} = \quad (12)$$
$$\min(f1_{TM}(BucketLevel_{i,Carrier_n}, T2PInflow_{i,Carrier_n}),$$
$$f2(BucketFactor_{i,Carrier_n}, FRAB_{Carrier_n}, T2PInflow_{i,Carrier_n}))$$

where $$f1_{TM}(;) =$$
$$\begin{cases} BucketLevel_{i,Carrier_n}/2 + T2PInflow_{i,Carrier_n}, & \text{if } TM = LoLat, \\ BucketLevel_{i,Carrier_n}/4 + T2PInflow_{i,Carrier_n}, & \text{if } TM = HiCap \end{cases}$$

$$f2(;) = BucketFactor_{i,Carrier_n}(10 * \log 10(T2PInflow_{i,Carrier_n}),$$
$$FRAB_{Carrier_n}) * T2PInflow_{i,Carrier_n}.$$

$BucketLevel_{i,Carrier_n}$ is the bucket level of application i on carrier $Carrier_n$ $T2PInflow_{i,Carrier_n}$ is the inflow into the bucket of application i on carrier $Carrier_n$ TM: Transmission mode $FRAB_{Carrier_n}$: the FRAB of $Carrier_n$ The $BucketFactor_{i,carrier\ n}$ may be set equal to or different from the $BucketFactor_i$ based on design considerations.

Figure 6:
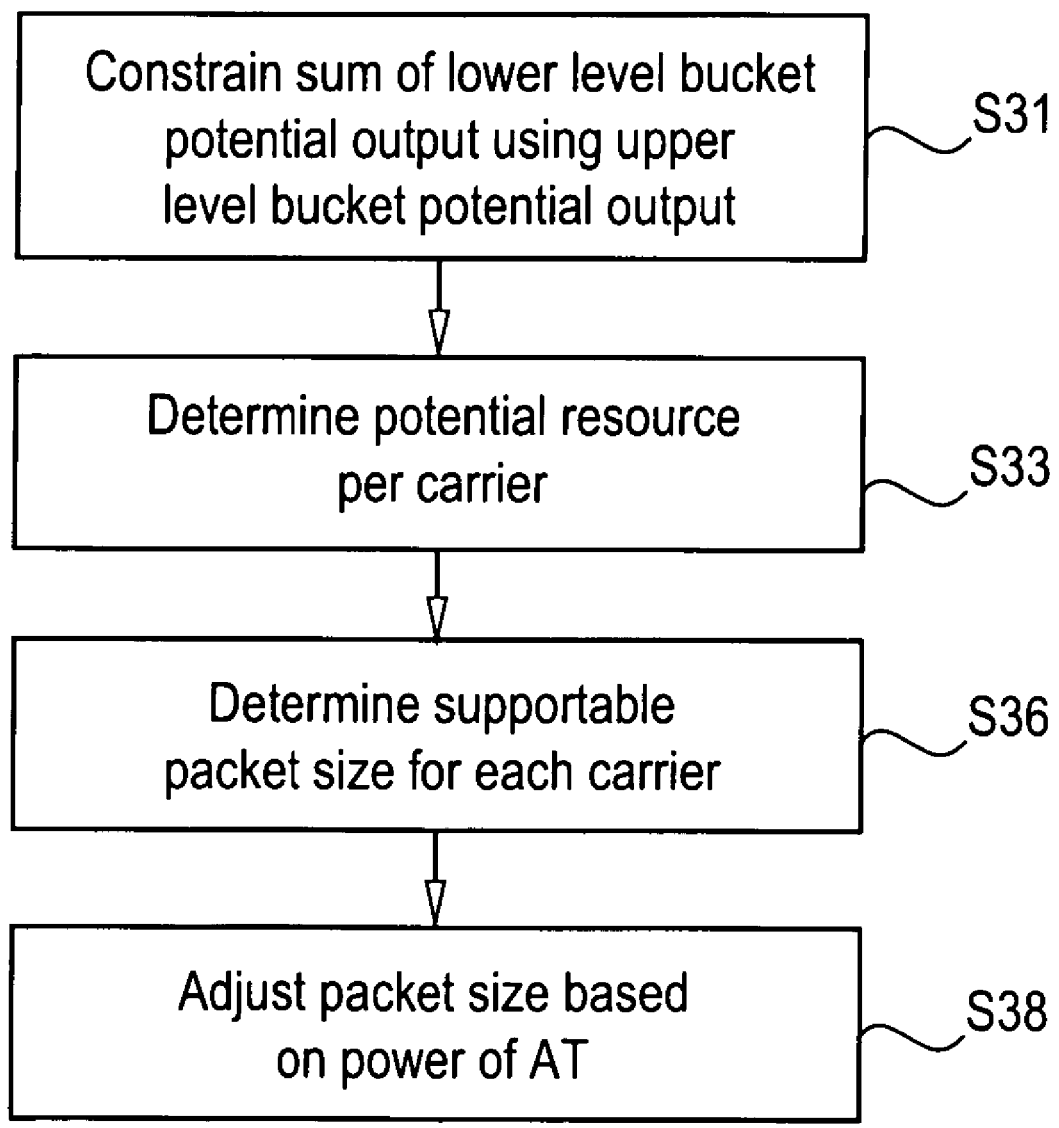
FIG. 6 illustrates a flow chart of step S30' in FIG. 5 according to one embodiment of the present invention.

Next, in step S30' the AT determines the packet size for each carrier. This methodology is illustrated in detail in FIG. 6. As shown, in step S31, the AT uses the scaled upper level bucket potential output $Scaled\_PotentialT2POutflow_i$ for application i across the carriers to constrain the sum of lower level per application per carrier bucket potential outputs $PotentialT2POutflow_{i,carrier\ n}$ across carriers. In particular, $$\text{If} \left( \begin{array}{l} Scaled\_PotentialT2POutflow_{TM,i} < \\ \displaystyle\sum_{Carrier_n} PotentialT2POutflow_{TM,i,Carrier_n} \end{array} \right) \text{then re-} \quad (13)$$

calculate $PotentialT2POutflow_{TM,i,Carrier_n}$ according to the following equation: $PotentialT2POutflow_{TM,i,Carrier_n} =$ $$\min \left( \begin{array}{c} \dfrac{PotentialT2POutflow_{TM,i,Carrier_n}}{\displaystyle\sum_{Carrier_n} PotentialT2POutflow_{TM,i,Carrier_n}} * \\ Scaled\_PotentialT2POutflow_{TM,i}, \\ PotentialT2POutflow_{TM,i,Carrier_n} \end{array} \right)$$

Otherwise, the PotentialT2POutflow$_{TM,i,carrier\ n}$ remains unchanged.

Next, in step S33, the AT calculates the potential resource on each carrier according to the following expression:

$$SumPotentialT2POutflow_{TM,Carrier_n} = \sum_i PotentialT2POutflow_{TM,i,Carrier_n} \quad (14)$$

where SumPotentialT2POutflow$_{TM,\ Carrier\ n}$ is the available resource on carrier n across all applications.

After step S33, the AT performs steps S36 and S38 in the same manner as described above with respect to FIG. 3 to determine the packet size supported by each carrier; however, in step S36 the SumPotentialT2POutflow$_{TM,carrier\ n}$ is used in place of the PotentialT2POutflow$_{TM}$_Carrier$_n$.

Returning to FIG. 5, in step S40, the AT loads each packet with data from the respective applications, and determines the actual transmit T2P for the carrier based on the loading as described in detail with respect to FIG. 4. Then, in step S60, the AT determines the T2POutflow$_{i,carrier\ n}$ per application per carrier. In one example embodiment, this is accomplished according to the following equation:

$$T2POutflow_{i,carrier n} = \frac{di\_carrier_n}{\sum_{i \in F_{TM}} di\_carrier_n} * T \times T2PPS\_Carrier_n \quad (15)$$

where di_carrier$_n$ is the data for application i on carrier n, and TxT2PPS_Carrier$_n$ is the transmit power on carrier n. Next, in step S70, the AT determines the T2POutflow$_i$ for each application i across the carriers by aggregating the T2POutflow$_{i,\ carrier\ n}$ for application i across the carriers as set forth below:

$$T2POutflow_i = \sum_{carrier_n} T2POutflow_{i,carrier_n} \quad (16)$$

The embodiments of the present invention provide for multi-carrier resource management such that better system capacity may be achieved without sacrificing individual performance. The capacity improvement may translate into a better cost efficiency.

The invention being thus described, it will be obvious that the same may be varied in many ways. For example, while described for the reverse link, it will be appreciated that all or a portion of the embodiments may be applied to the forward link. As another example, while described with respect to a multi-carrier CDMA system, the present invention may be applicable to other types of multi-carrier systems. Such variations are not to be regarded as a departure from the invention, and all such modifications are intended to be included within the scope of the invention.

We claim:

1. A method of managing a transmission resource for transmitting data from a number of applications in a multiple carrier communication system, comprising:
   determining, by a network element, a global load indicator, the global load indicator based on a load indicator of each of multiple carriers;
   determining an aggregate transmission resource available to the number of applications based on the global load indicator;
   distributing portions of the determined aggregate transmission resource to the carriers based on a load on each carrier;
   assigning data from at least one of the applications to at least one of the carriers based on the portion of the determined aggregate transmission resource distributed to the at least one carrier; and
   transmitting the assigned data on the at least one carrier based on a contribution from each of the at least one application, the contribution being a minimum value between (i) a stored value corresponding to the at least one application, and (ii) a value resulting from a contribution function based on a determined potential transmission resource for the at least one application on the carrier and a sum of the determined potential transmission resources for the at least one application for each carrier.

2. The method of claim 1, further comprising:
   determining a global load representative of a collective load on the carriers; and wherein
   the determining an aggregate transmission resource step determines the aggregate transmission resource based on the determined global load.

3. The method of claim 2, wherein the determining a global load representative step determines the global load as a minimum the loads on the carriers.

4. The method of claim 2, wherein the determining a global load representative step determines the global load as an average of the loads on the carriers.

5. The method of claim 2, wherein determining the global load representative step includes determining a short term indicator of the global load and a long term indicator of the global load.

6. The method of claim 1, wherein the transmission resource is a traffic-to-pilot power gain.

7. The method of claim 1, wherein the distributing step distributes more of the determined aggregate transmission resource to less loaded carriers than higher loaded carriers.

8. The method of claim 1, wherein the distributing step distributes the determined aggregate transmission resource in inverse proportion to a load on each carrier.

9. The method of claim 1, further comprising:
   determining a packet size of a transmission packet for each carrier based on the portion of the determined aggregate transmission resource distributed to a carrier; and wherein
   the assigning step loads the data in the transmission packet for the at least one carrier based on the determined packet size of the transmission packet for the at least one carrier.

10. The method of claim 9, further comprising:
    selectively adjusting the determined packet size based on a maximum available transmission power.

11. The method of claim 10, wherein the selectively adjusting step reduces the determined packet size of the transmission packet for a higher loaded one of the carriers before less loaded one of the carriers.

12. The method of claim 9, further comprising:
    determining an individual transmission resource available to the at least one application; and wherein
    the assigning step includes determining an amount of data from the at least one application to load onto the carriers based on the determined individual transmission resource available to the at least one application, the determined aggregate transmission resource, and the determined packet sizes of the packets for the carriers.

13. The method of claim 12, wherein the assigning step assigns the data to the carrier having the transmission packet with a largest determined packet size first.

14. The method of claim 13, further comprising:
reducing the packet size of the transmission packet for the at least one carrier after the assigning step if the reduction does not affect the amount of data assigned to the transmission packet.

15. The method of claim 13, wherein the transmitting step transmits the transmission packet for the carrier at a power associated with a size of the transmission packet.

16. The method of claim 9, wherein the transmitting step transmits the transmission packet for the carrier at a power associated with a size of the transmission packet.

17. The method of claim 1, further comprising:
determining an individual transmission resource available to the at least one application; and wherein
the assigning step includes determining an amount of data from the at least one application to assign to the carriers based on the determined individual transmission resource available to the at least one application and the determined aggregate transmission resource.

18. The method of claim 1, wherein the transmitting step transmits the data assigned to the at least one carrier at a power associated with an amount of the data assigned to the at least one carrier.

19. The method of claim 1, wherein the network element is one of an access node and a base transceiver station.

20. A method of managing a transmission resource for transmitting data from a number of applications in a multiple carrier communication system, comprising:
determining, by a network element, a global load indicator, the global load indicator based on a load indicator of each of multiple carriers;
determining a potential transmission resource for each application on each carrier based on the global load indicator;
determining a potential transmission resource for each application across the carriers;
selectively adjusting the determined potential transmission resource for an application on each carrier based on the determined potential transmission resource for the application across the carriers to be a minimum of (i) the determined potential transmission for the application on the carrier, and (ii) a function based on the determined potential transmission resource for the application on the carrier and a sum of the determined potential transmission resources for the application;
determining a carrier transmission resource for each carrier based on the selectively adjusted potential transmission resource for each application on the carrier;
assigning data from at least one of the applications to at least one of the carriers based on the determined carrier transmission resource for the at least one carrier; and
transmitting the assigned data on the at least one carrier.

21. The method of claim 20, further comprising:
scaling the determined potential transmission resource for each application across the carriers based on a number of the carriers supported for transmission.

22. The method of claim 21, wherein the selectively adjusting step adjusts the determined potential transmission resource for an application on each carrier if a sum of the determined potential transmission resources for the application on each carrier exceeds the scaled determined potential transmission resource for the application across the carriers.

23. The method of claim 22, wherein the function of the selectively adjusting step includes dividing the determined potential transmission resource for the application on the carrier by the sum of the determined potential transmission resources for the application on each carrier times the scaled determined potential transmission resource for the application across the carriers.

24. The method of claim 20, wherein
the determining a potential transmission resource for each application across the carriers step determines the potential transmission resource for each application across the carriers based on at least one global load indicator indicating a load on the carriers; and the determining a potential transmission resource for each application on each carrier step determines the potential transmission resource for each application on a carrier based on a carrier load indicator indicating a load on the carrier.

25. The method of claim 24, further comprising:
determining the at least one global load indicator.

26. The method of claim 25, wherein the determining at least one global load indicator step includes determining a short term indicator of the global load and a long term indicator of the global load.

27. The method of claim 20, wherein the determining a carrier transmission resource for each carrier step determines the carrier transmission resource for each carrier based on the adjusted potential transmission resource for each application on the carrier.

28. The method of claim 27, further comprising:
determining a packet size of a transmission packet for the at least one carrier based on the determined carrier transmission resource for the at least one carrier; and wherein
the assigning step loads the data in the transmission packet for the at least one carrier based on the determined packet size of the transmission packet for the at least one carrier.

29. The method of claim 28, wherein the determining a carrier transmission resource for each carrier step sums, after the selectively adjusting step, the determined potential transmission resources for each application on the carrier.

30. The method of claim 27, wherein the determining a carrier transmission resource for each carrier step sums, after the selectively adjusting step, the determined potential transmission resources for each application on the carrier.

31. The method of claim 20, wherein the determining a carrier transmission resource for each carrier step sums, after the selectively adjusting step, the determined potential transmission resources for each application on the carrier.

32. The method of claim 20, wherein the transmission resource is a traffic-to-pilot power gain.

33. The method of claim 20, wherein the network element is one of an access node and a base transceiver station.

* * * * *